United States Patent [19]

Henocque et al.

[11] Patent Number: 4,484,536
[45] Date of Patent: Nov. 27, 1984

[54] APPARATUS FOR INDICATING FLUID FLOW

[75] Inventors: Jean Henocque, Ste Adresse; Henri Besnard, Fecamp, both of France

[73] Assignee: Etablissements Trouvay and Cauvin S.A., Le Havre, France

[21] Appl. No.: 355,084

[22] Filed: Mar. 5, 1982

[51] Int. Cl.³ .............................................. G01F 15/00
[52] U.S. Cl. .................................... 116/275; 116/276; 137/557
[58] Field of Search ............... 116/264, 273, 274, 275, 116/276; 137/513.3, 527, 527.8, 513.5; 73/861.75

[56] References Cited

U.S. PATENT DOCUMENTS

| | | | |
|---|---|---|---|
| 2,029,633 | 2/1936 | Muhleisen | 116/275 |
| 2,187,257 | 1/1940 | Williams | 137/527 X |
| 3,251,335 | 5/1966 | Dannevik | 73/861.75 X |
| 3,565,099 | 2/1971 | Huber | 137/527.8 |
| 3,610,273 | 10/1971 | Russell | 137/513.3 |
| 3,745,967 | 7/1973 | Smith et al. | 73/861.75 |
| 3,857,277 | 12/1974 | Moore | 116/275 |
| 3,914,994 | 10/1975 | Banner | 73/861.75 |
| 4,274,436 | 6/1981 | Smith | 137/527 |

Primary Examiner—Gerald Goldberg
Assistant Examiner—Herron E. Williams

[57] ABSTRACT

A flow indicator has a pivoting flap fitted in ducting of a hydraulic installation which transports contaminated liquids. To permit the purge of a reservoir, the flap has an opening for air returning through the ducting. The opening prevents overpressure or vacuum in a circuit. The invention applies specifically to purge and vent circuits for nuclear power installations.

9 Claims, 4 Drawing Figures

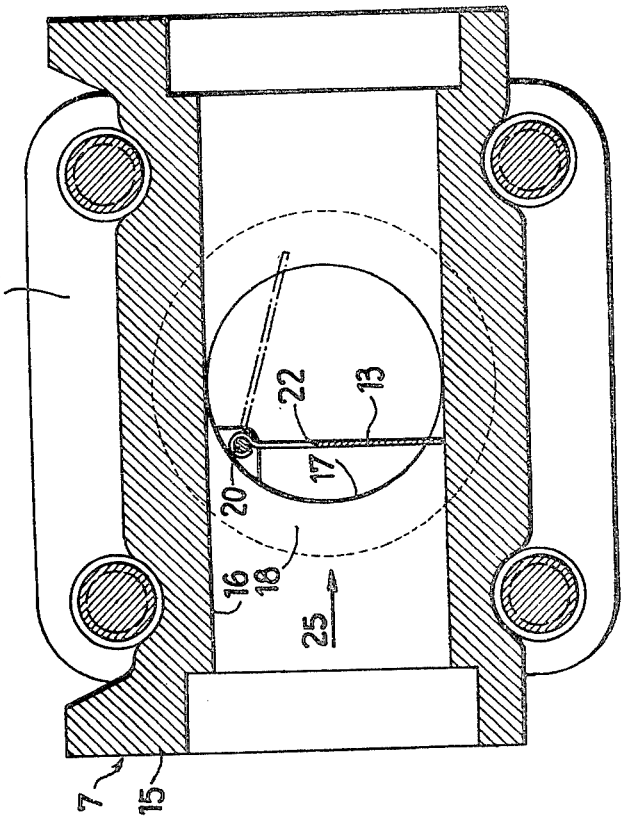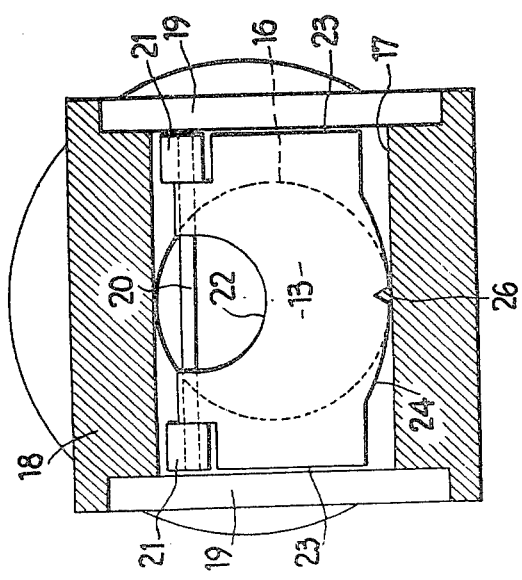

APPARATUS FOR INDICATING FLUID FLOW

The present invention relates to a horizontal fluid flow indicating apparatus (hereinafter called "indicator") having a pivoting flap, the apparatus being intended for fitting in the ducting of a hydraulic installation, particulary a nuclear power installation comprising a circuit which is common to the purge and vent outlets, is sealed to the atmosphere, and transports radio-active or contaminated liquids.

In the field of hydraulic circuits, it is known to use such fluid indicators or tell-tales, formed in general by a partly transparent housing, enabling the direction of possible fluid or liquid flow to be observed in the ducting and its rate of flow. To this end, certain known flow indicators comprise a movable flap, pivoting about a horizontal axis parallel to the direction of observation and perpendicular to the direction of movement of the fluid, these indicators being usually placed either in the overflow ducting of a reservoir, a pump, a heat exchanger or other apparatus, or in the purge ducting of the hydraulic circuit. In the first case, they enable a check to be made that the reservoir is filled as the liquid overflowing from the reservoir and channelled through the vent ducting tilts the flap in the direction of flow, while in the case of a purge, they enable an observation to be made that a liquid is still flowing or that it has been completely evacuated.

Even though such installations function well in the case where they communicate with the exterior, in the vicinity of the vent ducting, by comprising for example a vent orifice situated at the top end of the reservoir, pump or other apparatus, so as to prevent the appearance either of overpressure in a reservoir (for example) while it is being filled or a partial vacuum while it is being emptied. Now it is precisely this kind of disadvantage (overpressure or partial vacuum) that are likely to be encountered in general in the case of closed circuits and especially in the case of those which transport contaminated liquids where, for obvious reasons of safety, it is out of the question to have an opening to free air. To solve this problem, the idea is to increase the diameter of the duct collecting the purges, so as to enable it also to fulfill the function of collecting the vents.

The object of the present invention is to provide a flow indicator designed to be suitable for this kind of installation.

According the present invention provides an apparatus for indicating flow of liquid in a generally horizontal duct and comprising a housing for connection in said duct and a flap mounted in said housing for pivoting in response to said flow of liquid, characterised in that said flap defines an opening in the upper part of said housing for return flow of air in said duct.

Due to this arrangement, air disposed above the liquid flowing in the circuit can return freely through a vent line connected to the duct or through the duct itself.

In addition, when the contaminated liquids are to be transported in purge systems, in apparatus, according to a feature of the invention, wherein said housing comprises at least one flat circular sight glass, said housing comprises a sleeve for connection in said duct and at least one perpendicularly extending cylinder connecting said sight glass with said sleeve, said sleeve and said cylinder presenting cylindrical inner surfaces defining a space for movement of said flap and the bottom of cylindrical inner surface of said cylinder converging towards the bottom of the inner surface of said sleeve so as to ensure drainage of liquid from said cylinder and said sleeve.

The complete drainage of contaminated liquid may be essential, for example in nuclear power plant circuits transporting dangerous material.

The invention also includes a hydraulic installation including liquid flow apparatus as described above connected in said duct. According to an advantageous feature of the invention, said duct is connected to pipes which supply said liquid to said duct, said duct being of substantially bigger internal diameter than the pipes which are connected to it.

Other features and advantages of the invention will appear from the following description given by way of non-limitative example with reference to the accompanying drawings, in which :

FIGS. 2 and 3 are respectively longitudinal and transverse sectional views of a flow indicator in accordance with the invention.

Figure 1:
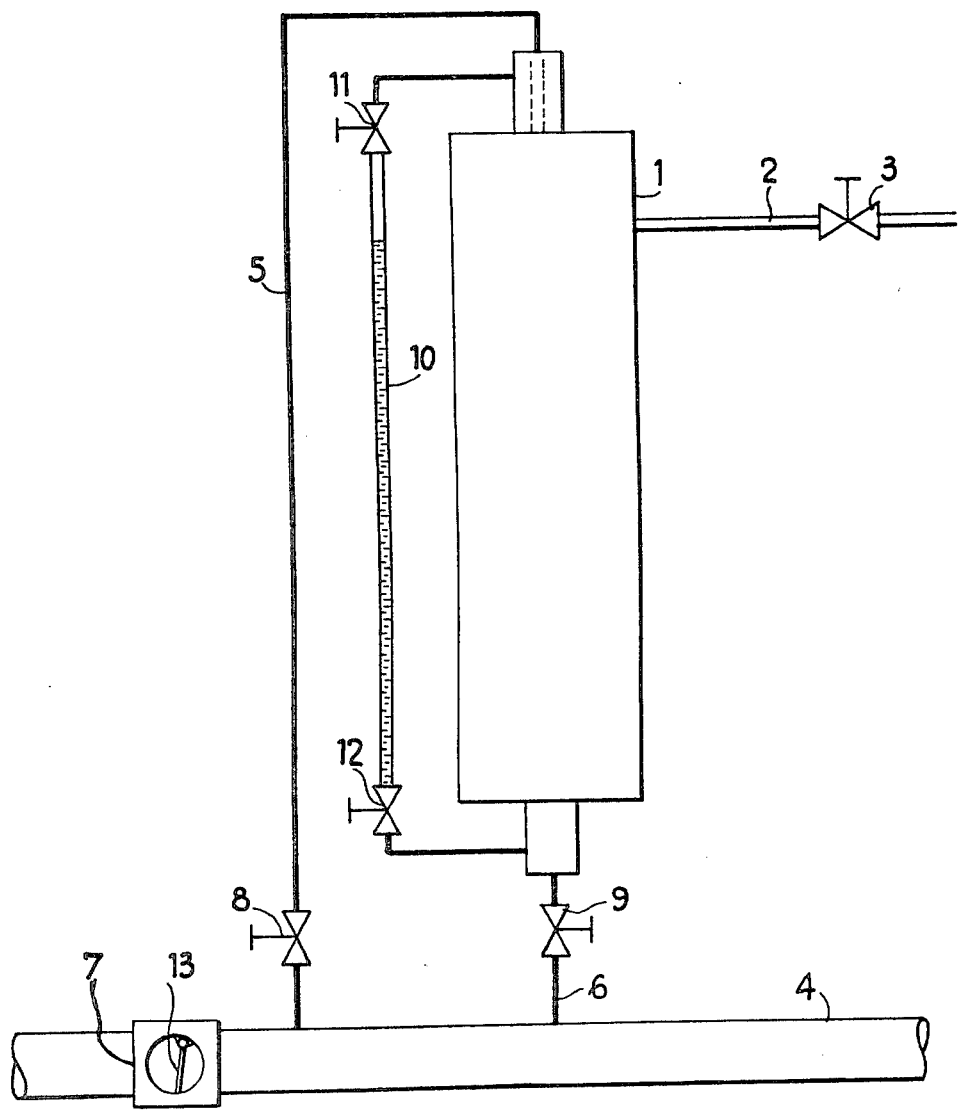
FIG. 1 is a schematic diagram of a closed circuit including a liquid storage reservoir, using a flow indicator in accordance with the invention.

The hydraulic circuit shown in FIG. 1 comprises a reservoir 1 connected by a duct 2 to a filling valve 3. The reservoir being connected through its top and bottom to a collector 4, respectively by a vent pipe 5 and a purge pipe 6. In the collector 4 is fitted an indicator 7 in accordance with the invention. In these pipes 5 and 6 are provided taps or cutoff valves 8 and 9. Moreover, the circuit comprises a column 10 forming a level indicator for the reservoir 1 and comprising two taps 11 and 12. The flow indicator 7, which contains a moving flap 13 and will be described in detail with reference to FIGS. 2 and 3, is directly fitted to the collector 4.

In FIGS. 2 and 3 are shown in detail the flow indicator 7 fixed in a fitment shown diagrammatically with the reference 14. The flow indicator 7 comprises a cylindrical sleeve 15 whose cylindrical internal surface 16 intersects the cylindrical internal surface 17 of a cylinder 18 of the same internal diameter as that of the sleeve 15, whose axis is perpendicular to that of the sleeve 15 and which bears two circular flat end glasses 19 sealing the assembly and enabling the movable flap 13 to be observed. The flap 13 can pivot about a horizontal spindle 20 (perpendicular to the direction of displacement of the fluid), whose ends are mounted in side bearings 21 solid with the cylinder 18, so as to adopt a horizontal position. The flap 13 comprises in its upper part a cutout or aperture 22, for example of semi-circular shape. Moreover, the flap 13 has vertical sides 23 directly juxtaposed with the vertical flat glasses 19, and a bottom 24 whose shape conforms to the shape of the surface at the inside of the indicator 16.

It can thus clearly be seen from FIGS. 2 and 3 that, when liquid flows in the direction indicated by the arrow 25 through the flow indicator 7, the liquid pushes the flap 13 to the right, while the displaced air can flow freely through the cut-out 22 at the top of the flap. Moreover, the flap 13 comprises, at its bottom 24, an indent 26 designed to enable the last of the liquid left behind the flap to flow past it even when it is in the closed position.

In accordance with the invention, the inner diameter of the collector 4 in which the indicator 7 is fitted is substantially greater than the diameter of the ducts which are connected to it. Moreover, no zone trapping fluid is left in the bottom of the sleeve 15, since in the vicinity of the intersection of the two internal cylindrical surfaces 16 and 17, of the same diameter, all the lines of the surface 16 converge towards the bottom most generatrix of the surface 17.

The reservoir 1 is filled through the duct 2, the tap 9 being opened, the level indicator 10 being connected through the taps 11 and 12 and the vent tap 8 and filling tap 3 being opened. The filling is complete when the water, overflowing from the reservoir into the vent line 5, appears in the flow indicator 7, displacing the movable flap 13 towards the left (as shown in FIG. 1).

The reservoir is emptied by closing the filling tap 3, and opening the vent tap 8, then the purge tap 9 (the two level indicator taps 11 and 12 remaining open). Under the pressure of the head of water in the reservoir 1, the water flows down through the tap 9 and is replaced in the reservoir by air which, after having flowed back against the liquid current (through the opening 22), penetrates into the reservoir through the vent duct 5.

Figure 4:
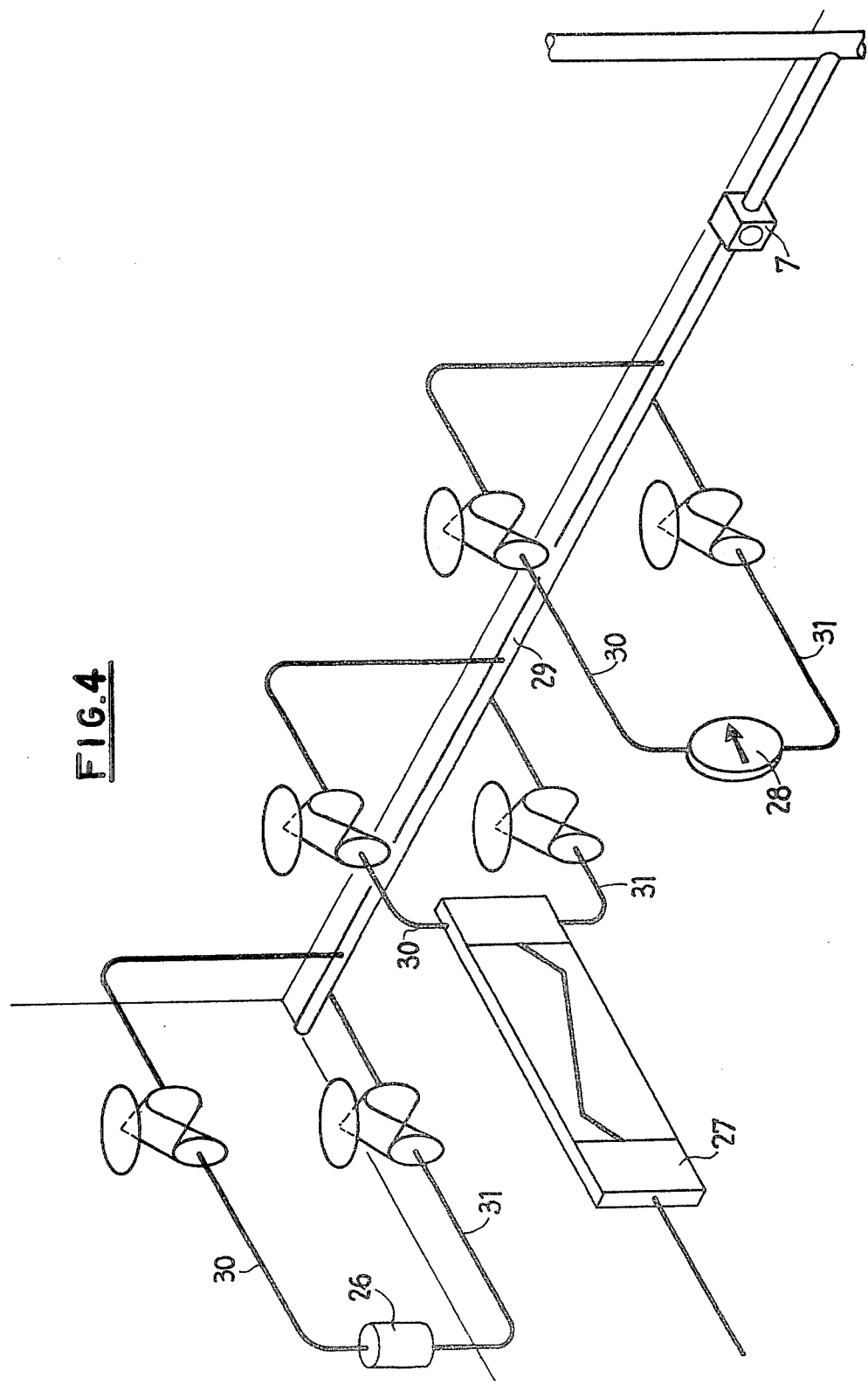
FIG. 4 is diagram illustrating the collection of the purges and vents of a hydraulic system having multiple circuits comprising a plurality of contaminated apparatuses.

FIG. 4 shows the case of a collector for the purges and vents of a plurality of apparatuses such as, for example, a reservoir 26, a heat exchanger 27 and a pump 28 fitted in circuits analogous to that of FIG. 1 and connected in parallel to a common collector duct 29 of diameter substantially greater than that of the various purge and vent lines 30 and 31. A common flow indicator 7 is connected downstream of all the purge and vent circuits, in the common collector duct 29.

We claim:

1. Apparatus for indicating flow of liquid in a generally horizontal duct and comprising a housing for connection in said duct and a flap mounted in said housing for pivoting in response to said flow of liquid, characterised in that said flap defines an opening in the upper part of said housing for flow of air in said duct, the housing comprising at least one flat circular sight glass, characterised in that said housing comprises a sleeve for connection in said duct and at least one perpendicularly extending cylinder connecting said sight glass with said sleeve, said sleeve and said cylinder presenting cylindrical inner surfaces defining a space for movement of said flap, and a bottom of a cylindrical inner surface of said cylinder converging towards the bottom of the inner surface of said sleeve so as to ensure drainage of liquid from said cylinder and said sleeve.

2. Apparatus as claimed in claim 1, characterised in that the bottom and side edges of said flap are shaped so as to fit the inner surface of said housing swept by said flap as it pivots under the pressure of liquid flowing in said housing.

3. An installation as claimed in claim 2, characterised in that said duct is connected to pipes which supply said liquid to said duct, said duct being of substantially bigger internal diameter than the pipes which are connected to it.

4. An installation as claimed in claim 3, characterised in that said duct is connected to receive liquid from a plurality of purge and vent circuits of different apparatuses, said apparatus for indicating flow of liquid being connected downstream of said circuits in said duct.

5. Apparatus for indicating fluid flow in a generally horizontal duct and comprising a housing for connection in said duct and a flap mounted in said housing for pivoting in response to said flow of liquid, characterized in that an upper part of said flap defines an opening in an upper part of said housing for flow of air from said duct in a return direction through said opening simultaneously with forward liquid flow through a lower part of said housing, the housing comprising a cylindrical sleeve with a cylindrical internal surface for mounting in the duct in continuation of the duct and in continuation of a cylindrical internal surface intersecting with the cylindrical sleeve and its cylindrical internal surface in perpendicular relation thereto and two circular flat end glasses sealing opposite ends of the second cylinder and wherein the flap is mounted in side bearings on opposite sides of the second cylinder near the end glasses and a spindle mounted between the side bearings and extending in an axial direction through the second cylinder and wherein the flap is mounted on the spindle for rotation about the spindle within the second cylinder and wherein the flap extends generally perpendicular to the cylindrical sleeve.

6. An apparatus as claimed in claim 5 wherein the flap has generally vertical ends near the glasses and has rectangular portions extending inward therefrom and a curved lower portion having a larger radius than a radius of the internal surface of the cylindrical sleeve for blocking a lower portion of the cylindrical sleeve and for rotating upward about the spindle and blocking successive upper portions of the cylindrical sleeve.

7. Apparatus as claimed in claim 6 wherein the curved lower portion has an upward pointing indent at its center for allowing liquid to flow past the flap even when the flap is in a downward closed position.

8. Apparatus as claimed in claim 5 wherein the opening comprises a U-shaped opening extending downward from an upper central portion of the flap in alignment with an upper portion of the cylindrical internal surface of the cylindrical sleeve.

9. Apparatus as claimed in claim 8 wherein the flap is supported on the spindle on opposite sides of the cylindrical internal surface.

* * * * *